(12) United States Patent
Laxström

(10) Patent No.: US 8,328,219 B2
(45) Date of Patent: Dec. 11, 2012

(54) BICYCLE FRAME AND BICYCLE

(75) Inventor: Ulf Laxström, Mustasaari (FI)

(73) Assignee: Fubicom AB Oy, Korsholm (FI)

( * ) Notice: Subject to any disclaimer, the term of this patent is extended or adjusted under 35 U.S.C. 154(b) by 385 days.

(21) Appl. No.: 12/530,399

(22) PCT Filed: Mar. 6, 2008

(86) PCT No.: PCT/FI2008/050105
§ 371 (c)(1),
(2), (4) Date: Nov. 20, 2009

(87) PCT Pub. No.: WO2008/107521
PCT Pub. Date: Sep. 12, 2008

(65) Prior Publication Data
US 2010/0066055 A1    Mar. 18, 2010

(30) Foreign Application Priority Data
Mar. 6, 2007   (FI) ..................... 20070192

(51) Int. Cl.
*B62K 19/18*   (2006.01)
(52) U.S. Cl. ........................................ 280/279
(58) Field of Classification Search .......... 280/279
See application file for complete search history.

(56) References Cited

U.S. PATENT DOCUMENTS

| | | | | |
|---|---|---|---|---|
| 3,866,946 A * | 2/1975 | Robison | ............ | 280/279 |
| 4,129,317 A * | 12/1978 | Bell | ............ | 280/281.1 |
| 4,440,414 A * | 4/1984 | Wang | ............ | 280/287 |
| 4,462,606 A * | 7/1984 | Hon | ............ | 280/278 |
| 4,600,207 A * | 7/1986 | Zosi | ............ | 280/279 |
| 4,700,963 A * | 10/1987 | Burns et al. | ............ | 280/276 |
| 5,069,468 A | 12/1991 | Tsai et al. | | |
| 5,125,678 A | 6/1992 | Bogen | | |
| 5,383,676 A * | 1/1995 | Valentino | ............ | 280/271 |
| 7,438,306 B2 * | 10/2008 | Mrdeza et al. | ............ | 280/279 |

FOREIGN PATENT DOCUMENTS

| | | |
|---|---|---|
| EP | 1 757 518 | 2/2007 |
| EP | 1 801 004 | 6/2007 |
| GB | 2 289 874 | 12/1995 |
| WO | 88/05394 | 7/1988 |
| WO | 9951485 A1 | 10/1999 |

OTHER PUBLICATIONS

International Search Report dated Jun. 24, 2008, from corresponding PCT application.
Finnish Search Report dated Feb. 1, 2008, from corresponding Finnish application.
Supplementary European Search Report, dated Jul. 20, 2011, in Application No. EP 08 71 8558.

* cited by examiner

*Primary Examiner* — Lesley D Morris
*Assistant Examiner* — Daniel Yeagley
(74) *Attorney, Agent, or Firm* — Young & Thompson

(57) ABSTRACT

A bicycle frame, has a pedal hub connection part and a frame column part. The invention also relates to a bicycle and a method and assembly kit for assembling the bicycle frame and bicycle. The bicycle frame (1) according to the invention has a separate front fork (7) with a head tube (7P) and one or several openable head tube connection parts (5) for openably connecting the front fork (7), and that the openable head tube connection part (5) has an unrotatable connection element (21) for unrotatably connecting the head tube (7P) of the front fork (7) and that the head tube (7P) has a bearing assembly (19) for rotatably connecting the front fork (7) and the head tube (7P) to each other, and that the front fork head tube (7P) is connected to the bearing assembly (19) from the inside.

29 Claims, 12 Drawing Sheets

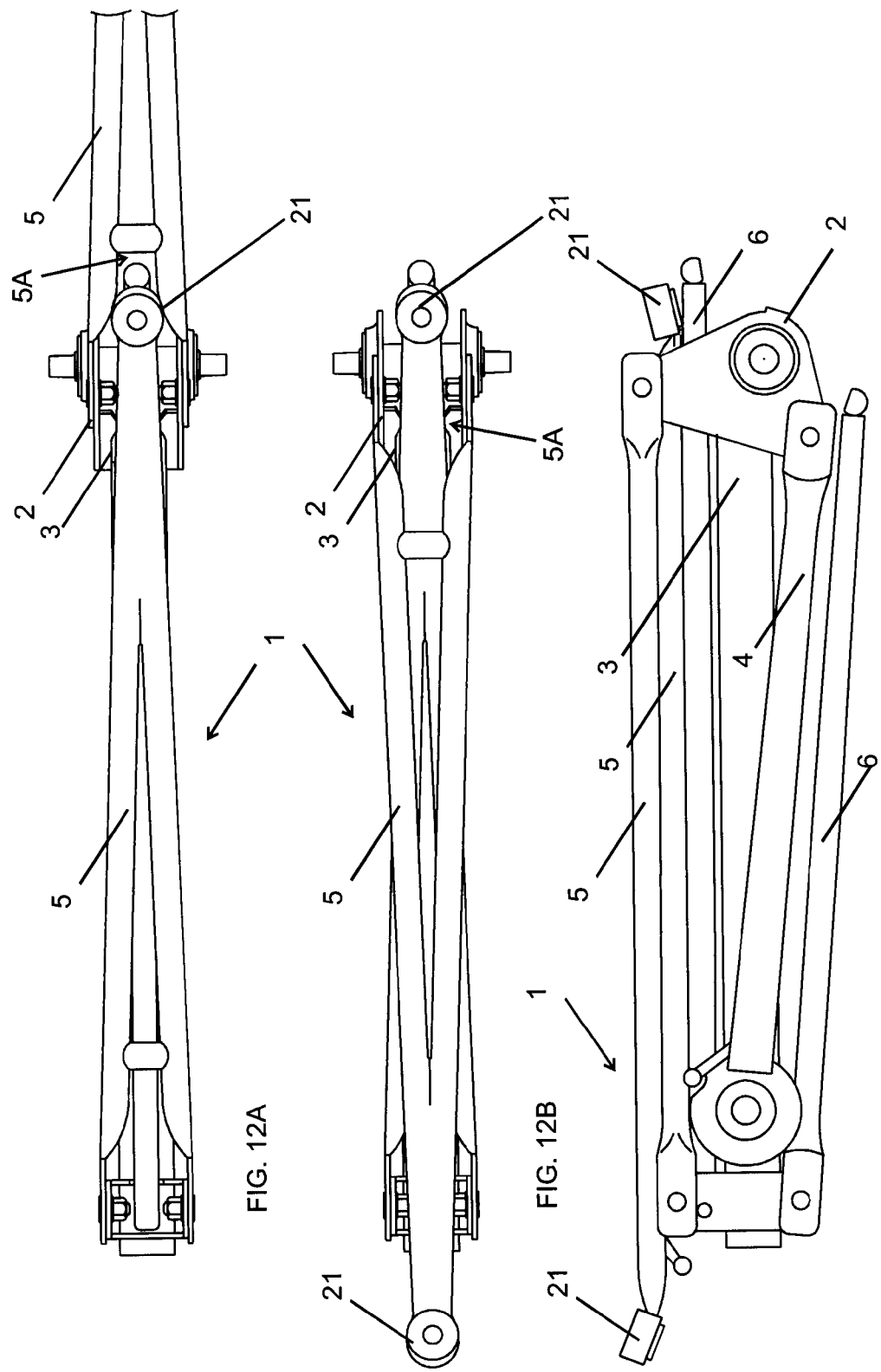

BICYCLE FRAME AND BICYCLE

BACKGROUND OF THE INVENTION

1. Field of the Invention

The object of the invention is a bicycle frame with a pedal hub connection part and a frame column part. The invention also relates to a bicycle and a method and assembly kit for assembling the bicycle frame and bicycle.

2. Description of the Related Art

A bicycle traditionally has a stationary frame part. Such a bicycle takes relatively much space during transport. There also are bicycles, which are foldable, but even then they will require quite a lot of transport space both in the longitudinal and lateral direction.

SUMMARY OF THE INVENTION

Now there has been invented a bicycle frame, which can be put in an especially small space, when needed.

The bicycle frame of the invention with a pedal hub connection part and frame column part has one or several frame parts that have been connected to each other either indirectly or directly by a folding connection, such as s folding joint. The bicycle frame of the invention further has a separate front fork with a head tube, and the bicycle frame is provided with one or several operable connection parts of the head tube for openably connecting the front fork. Such a bicycle frame can be placed into an especially small space both in the longitudinal and lateral direction, because the parts can be folded in the same direction on top of each other, interlocked and/or adjacent to each other. In addition, also a separate front fork openable from the rest of the frame takes especially little space e.g. during storage and transport.

There are preferably at least two openable head tube connection parts, such as the upper and lower openable head tube part. Depending on the application, there can be one or several upper and lower connection parts. Preferably the openable head tube connection part has one or several folding connections. There solutions will further improve the bringing of the bicycle frame into an especially small space. The foldable parts are assemblies with good strength. When they are connected to each other with a solid folding connection, the bicycle frame can be assembled to be especially solid. This is essentially advantageous, because such a bicycle frame can be brought into an especially small space fast and effortlessly during transport and storage. The folding connections between parts are structurally durable. The front fork structures normally take a lot of space. Now it is possible to fold them into a small space. In this case, the fold ability of these parts is especially advantageous.

According to an object of the invention, the bicycle frame has a foldable and openable head tube connection part and front fork with a head tube, provided with bearings for rotatably connecting the front fork and the head tube to each other. The head tube of the front fork and the openable connection parts of the head tube are connected to each other in an unrotating manner. This has the benefit that a very simple and durable steering bearing can be achieved with this solution. A separate head tube makes it possible to separate the front fork from the rest of the frame in an advantageous manner. On the other hand, the front fork head tube is one of the central frame parts in this solution. Joining the front fork connection parts unrotatably to the head tube provides the frame with good solidity and torsional rigidity. Further, it simplifies the bicycle's connection structures also in other ways.

The front fork head tube has preferably one or several openable connection elements for connecting the front fork connection parts and the head tube unrotatably to each other. Preferably, the openable connection parts of the head tube have been connected to the head tube with bayonet connection elements, such as a screw joint or similar. This has the advantage that the openable connection parts of the head tube can be detached from the front fork and folded in the direction of the other frame parts so that they take as little space as possible. The front fork and the head tube can be fitted with bearings in relation to each other in different ways. According to an object of the invention, the head tube of the front fork is internally attached to the steering bearing on the inside. The advantage of this is that the openable connection parts of the head tube can be easily detached from the front fork and that it is simultaneously possible to achieve a very firm frame with good torsional rigidity.

According to an object of the invention, the front fork is attached to the other parts of the frame with a folding joint. One advantageous embodiment is to provide the frame with at least two tie rods for the front fork, of which the one tie rod is connected to the front fork/head tube with a folding joint, and the other tie rod is connected to the front work/head tube with an openable joint, such as a ball joint. In this case, also the front fork/head tube can be folded in the direction of the rest of the frame.

According to an object of the invention, a front fork has been connected to the bicycle frame, which front fork has collapsible handlebars, such as handlebars that can be folded in the direction of the front fork or collapsible handlebars that are interlocked/on top of each other in the open/riding position.

According to an object of the invention, the bicycle frame has a foldable back fork part. Such embodiments are advantageous, because these frame parts take relatively much space in the bicycle. The invention has thus, for example, the advantage that e.g. a back fork which is considerably wide and takes a lot of space can be brought into an especially small space together with the bicycle attaching means.

According to an object of the invention, the frame part can be folded at least partly in the direction of a second frame part. This is essentially advantageous, because it will further reduce the need for space of the bicycle frame e.g. during transport and storage.

According to an object of the invention, the frame part can be folded in relation to the second frame part at least partly superimposed and/or interlocked. Preferably, the frame part can be folded at least partly interlocked in relation to the second frame part for folding the bicycle frame. This will further reduce the need for space of the bicycle frame, because with this solution the frame can be made to take especially little space when folded.

According to an object of the invention, the bicycle frame has one or several support parts. This is essentially advantageous, because the support parts make the bicycle frame solid upon assembling. The support parts are also preferably parts of the bicycle frame so that the bicycle can be brought into as small a space as possible, when needed, and it can be made especially solid upon assembling. The support part is preferably connected to the bicycle frame part with a folding joint from the one end and with an openable joint, such as a ball joint from the other end. This will make the assembling and folding of the frame more versatile and faster, and at the same time, the bicycle frame can be made solid.

According to an object of the invention, the folding joint is a cone joint. This is an easy-to-use, firm and solid connection so that the frame part can be made especially good from the technical point of view.

According to an object of the invention the bicycle frame part has one or several flexible bearing housings. In this application, the flexible bearing housing refers to a bearing housing with a flexible structure. Flexibility can have been achieved, for example, by forming and/or shaping the material and/or by making use of the natural elasticity in the material. A flexible bearing housing makes possible a simple joint structure and, in addition, it is structurally durable. The use of flexible bearing housings in the front fork and back fork makes advantageously possible the structurally uniform front and back wheels. In this case, the front and back wheels are also interchangeable. Also the back and front wheel axles are then very narrow so that two detachable wheels can be easily transported e.g. side by side.

According to an object of the invention, the bicycle frame has one or several flexible bearing housings and, respectively, the bearing to be connected to it has an adapter stop element for fastening the bearing to the bearing housing. The adapter stop element is preferably a slot in the outer circumference of the bearing corresponding to elasticity. Advantageously, the bearing housing yields structurally at least for the depth of the adapter stop element when attaching and/or detaching the bearing.

According to an object of the invention the bicycle frame has two adjacent foldable back fork parts, which have been attached to each other. The back fork parts can be the lower or upper forks of the frame. This will increase the solidity of the frame part further. Both forks have preferably a flexible bearing housing for connecting the back wheel. The flexible bearing housing is structurally advantageous and, in addition, it makes possible a simple back wheel structure. This causes both financial and manufacture-technical advantage. In addition, the structure of the connection is very firm.

According to an object of the invention, the bicycle frame has a back fork part, which has external back wheel package with a free wheel. By means of the external back wheel package the structures of the back wheel itself will become simpler. The free wheel improves usability and existing products can advantageously be used in it.

According to an object of the invention the bicycle frame has a back fork part, which is provided with a detachable joint axle for the back wheel with joints, such as a slot joint and/or spiral joint for connecting to the back wheel package and for transmitting the pedal force from the back wheel package to the back wheel hub. This is a technically preferable way to connect the back wheel. It also makes the disassembly and assembly of the back wheel faster so that it is useful also from the point of view of use and manufacture.

According to an object of the invention, the back fork part has a connecting piece for connecting the back wheel package to the bearing in the back wheel.

According to an object of the invention, a front fork has been connected to the bicycle frame, the fork part of which has a flexible bearing housing for connecting the front wheel. The flexible bearing housing is structurally advantageous and, in addition, it makes possible a simple front wheel structure. This has both financial and manufacture-technical benefit. In addition, it is of a very solid structure.

According to an object of the invention, the pedal hub connection part has a flexible bearing housing for connecting the pedal hub wheels and cranks. The flexible bearing housing has an advantageous structure and, in addition, it makes possible simple pedal hub wheels. This has both financial and manufacture-technical benefits. In addition, it is of a very solid structure.

According to an object of the invention, at least one pedal crank is connected to the pedal hub connection part, the crank being collapsible. This will advantageously reduce the need for space of the bicycle frame part further e.g. during transport and storage.

According to an object of the invention, the bicycle frame is provided with an upper/lower gear shifter for shifting the chain from up and/or down. This solution makes possible the shifting while the pedal direction is forwards, as usual, and the shifting while the pedal direction is backwards. Thus, the bicycle gear can be advantageously shifted also when the bicycle is stationary. The manufacture and disassembly of the structure is further technically simple and fast, and it takes considerably less space compared to a traditional gear shifter.

According to an object of the invention, a separate chain tightening part is attached to the bicycle frame at a distance from the gear shifter. A separate part is easier to manufacture and dismantle compared to a chain tightening part that is stationarily fixed to the gear shifter. It can also be made technically strong and durable.

The chain tightening part can advantageously be used as a gear shifter in the pedal hub. Transferring the chain tightening part in the lateral direction causes the chain to move in the chain wheels/sprocket wheels in the pedal hub.

According to an object of the invention, the bicycle frame has an upper/lower gear shifter, a separate chain tightening part and a chain, which form a uniform assembly. It is not necessary to detach them from the frame upon folding. This has, for example, the advantage that it is not necessary to touch the oily chain and wheels when folding the frame and/or detaching the wheels.

According to an object of the invention, the bicycle frame has a front fork locking element for locking the position of the front fork. The locking element is advantageously provided with a key so that the locking position can be switched to closed/open when desired. Locking the position of the front fork is preferable when assembling the frame, because the front fork can be made non-turning so that the fastening of the parts is easier. The lockable front fork also has the advantage that the assembled bicycle can be easily made to stay up, for example, against a support, because the front work will not rotate to the side. The locking element provided with a key also has the advantage that it is more difficult for an outsider to take a locked bicycle.

The bicycle frame according to the invention can be advantageously realized as an assembly kit, because the assembly of the frame part is simple and fast.

The bicycle frame of the invention can be used, for example, in a bicycle, exercise bike, such as a spinning bike, test bike, hand bike or recumbent.

A bicycle according to the invention, such as a bicycle, exercise bike, test bike, hand bike or recumbent can be advantageously realized as an assembly kit so that the assembly of the bicycle is simple and fast.

BRIEF DESCRIPTION OF THE DRAWING FIGURES

Some embodiments of the invention will be explained next in more detail, referring to the enclosed drawings.

FIGS. 12A-12C illustrate the folding of the bicycle frame.

DETAILED DESCRIPTION OF THE INVENTION

Figure 1:
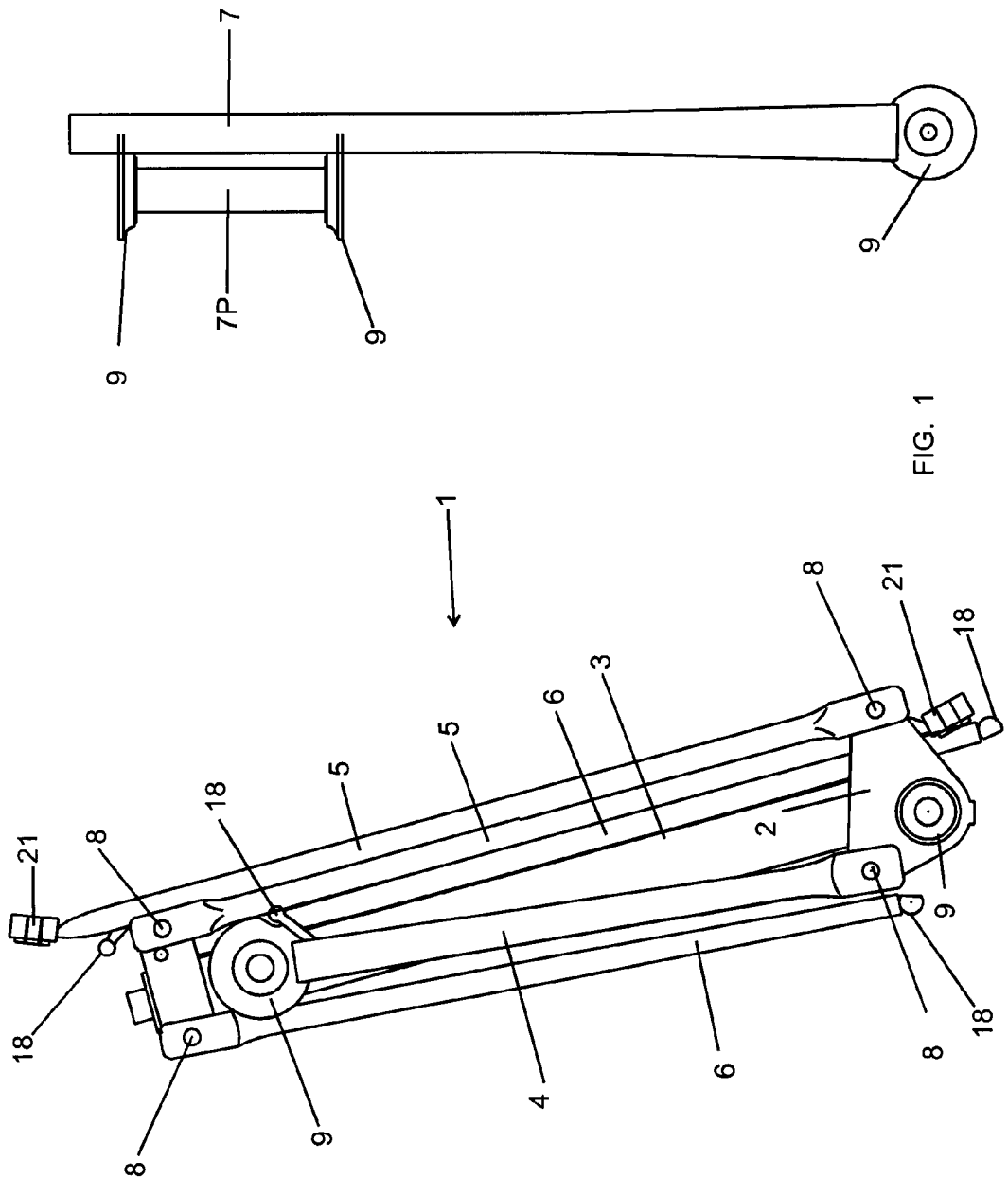
FIG. 1 illustrates a bicycle frame of the invention in a folded state.
Figure 2:
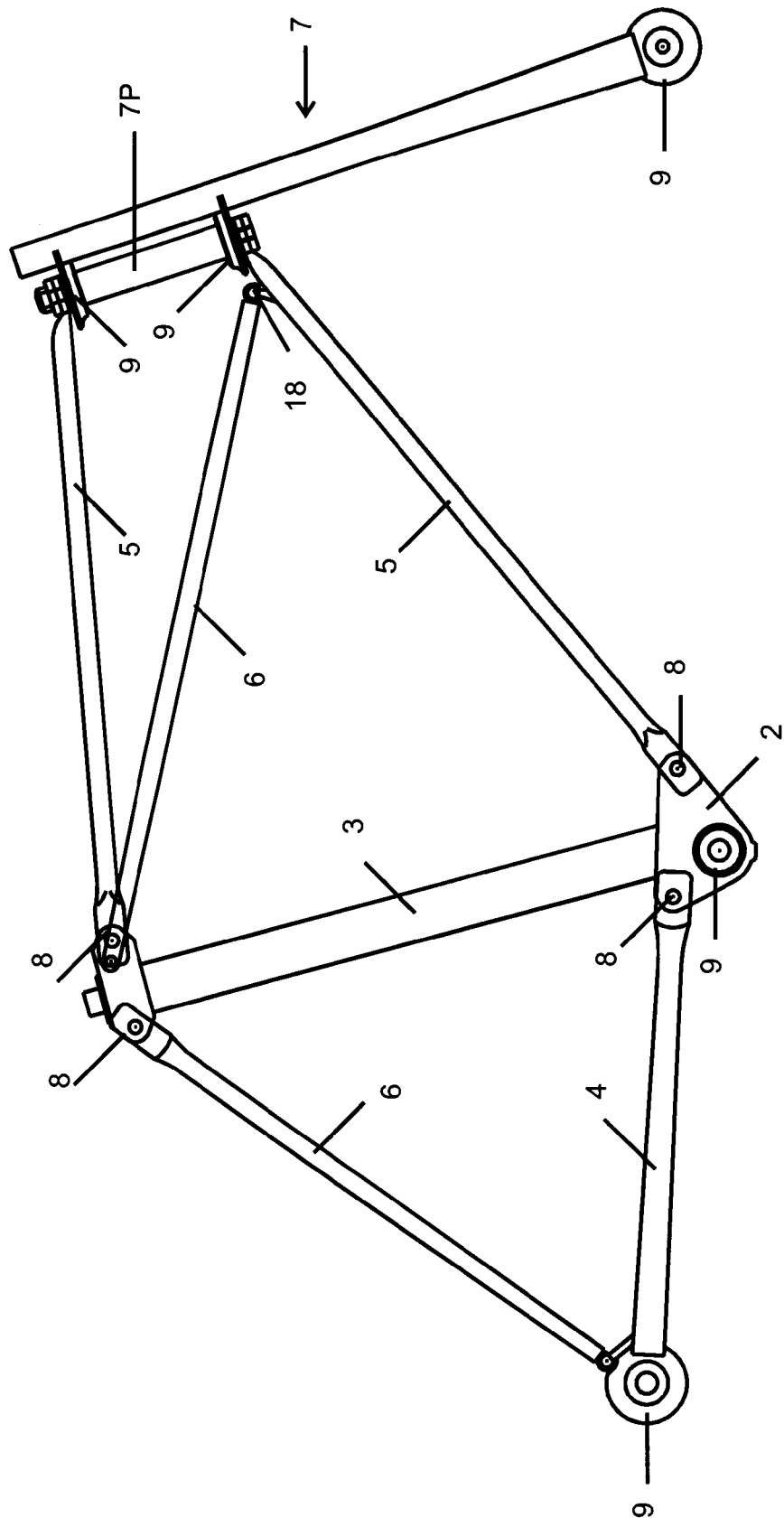
FIG. 2 illustrates a bicycle frame of the invention in an assembled state.

FIGS. 1 and 2 illustrate a bicycle frame 1, which is provided with a pedal hub connection part 2, a frame column part 3, a back fork part 4, and a foldable and openable head tube connection part 5, the parts having been connected to each other with folding joints 8. The folding joints 8 are preferably cone joints. The frame parts 2, 3, 4, 5, 6 are foldable at least in part essentially in the direction of the second frame part 2, 3, 4, 5 and/or at least partly superimposed and/or interlocked. The bicycle frame 1 has several support parts 6 for supporting the other frame parts 2, 3, 4, 5. The support parts 6 are connected to the back fork part 4 and the connection bars 5 of the front fork also with ball joints 18. FIGS. 1 and 2 additionally show the bicycle frame 1 with an openable head tube connection part 5, at the end of which there is provided a head tube connection element 21, to which the head tube 7P of the front fork 7 has been connected in an non-turning manner, the head tube having a flexible bearing housing 9 for connecting the head tube 7P and the connection part 5 rotatably to each other. In addition, the front fork 7 has been attached to the bicycle frame 1, the front fork including flexible bearing housings 9 for attaching the front wheel (not shown).

The bicycle frame 1 shown in FIGS. 1 and 2 has advantageously two foldable back fork parts 4, which are attached to each other and which have a flexible bearing housing 9 for fastening the back wheel (not shown).

Figure 3:
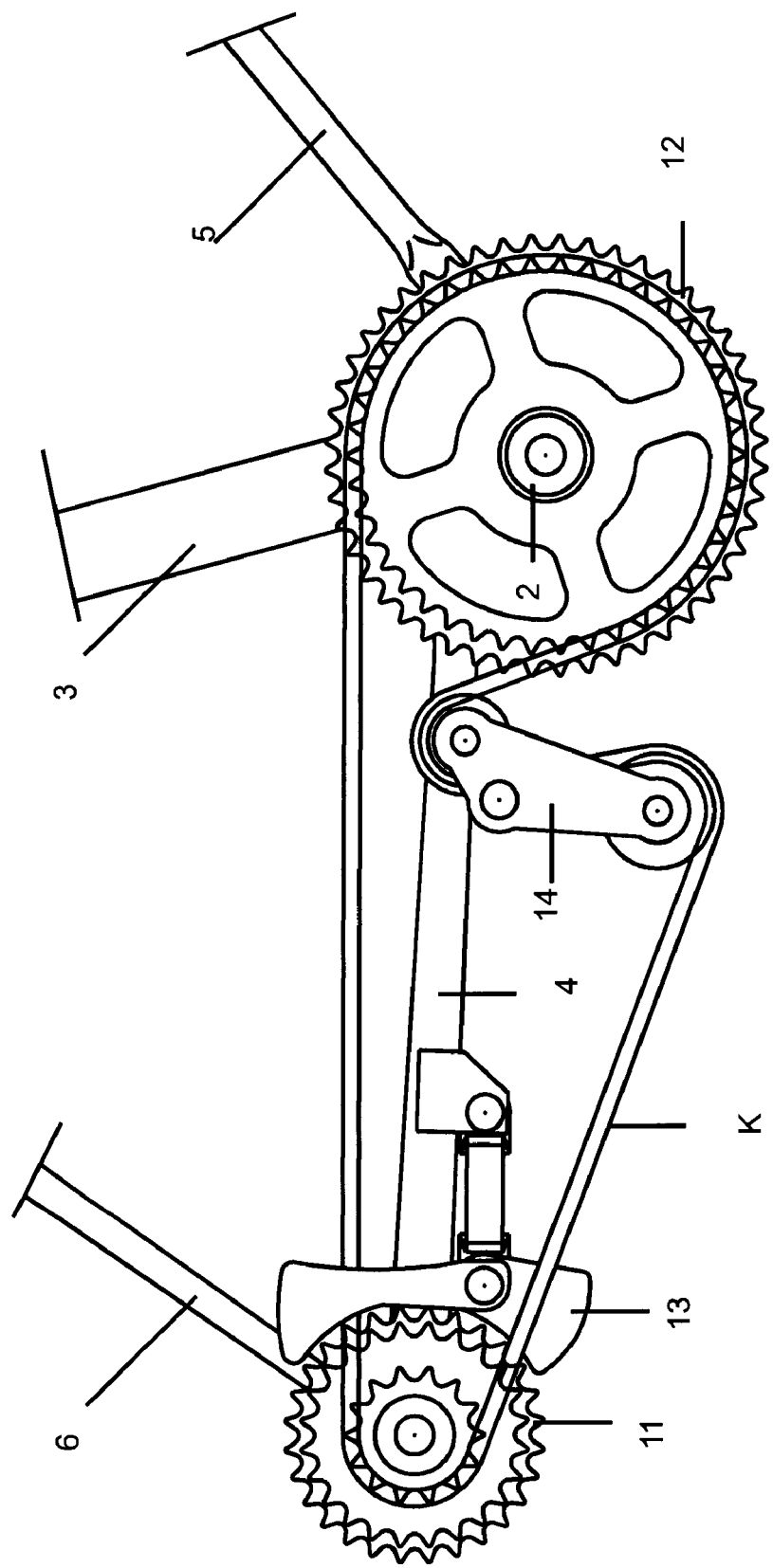
FIG. 3 illustrates a gear shifter and a chain tightening part.

In FIG. 3 there is shown an upper/lower gear shifter 13 for shifting the chain K up and down in the wheel packages 11, 12 and a separate chain tightening part 14 at a distance from the gear shifter 13. FIG. 3 also discloses a pedal hub connection part 2, a frame column part 3, a back fork part 4, and a foldable and openable head tube connection part 5.

Figure 4:
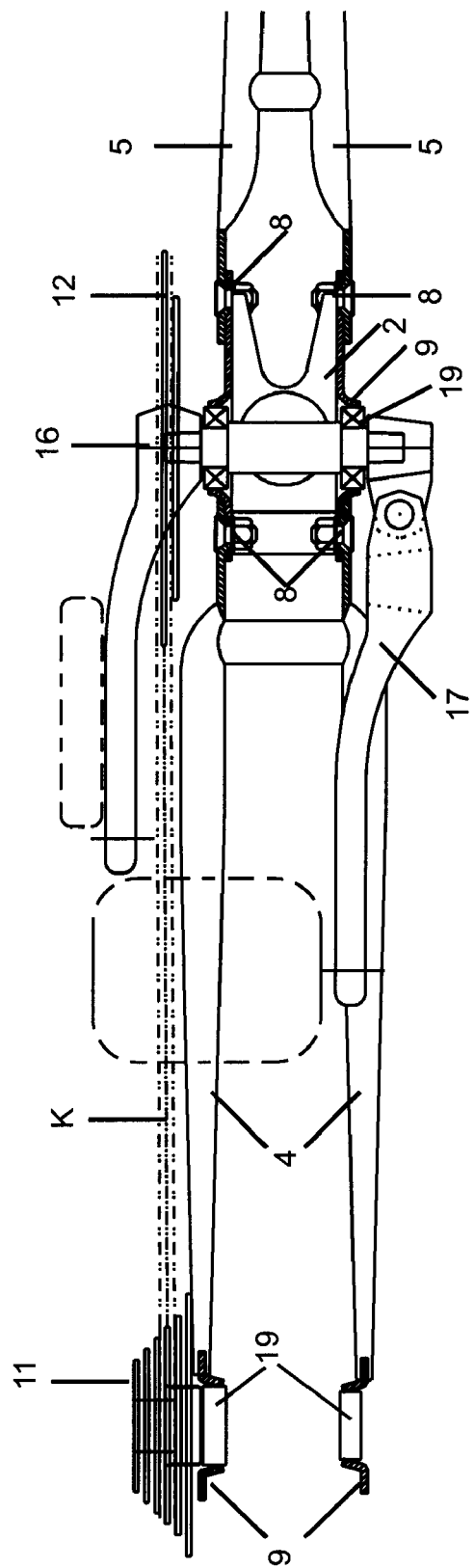
FIG. 4 illustrates a pedal hub connection part.

FIG. 4 discloses a pedal hub connection part 2, which has a flexible bearing housing 0 for connecting the pedal hub wheels 16. The pedal hub wheels 16 have one foldable pedal crank 17 and front wheel package 12. FIG. 4 also illustrates a back wheel package 11 and chains K, and a back fork part 4 and an openable head tube connection part 5, which have been connected to the pedal hub connection part with cone joints 8.

Figure 5:
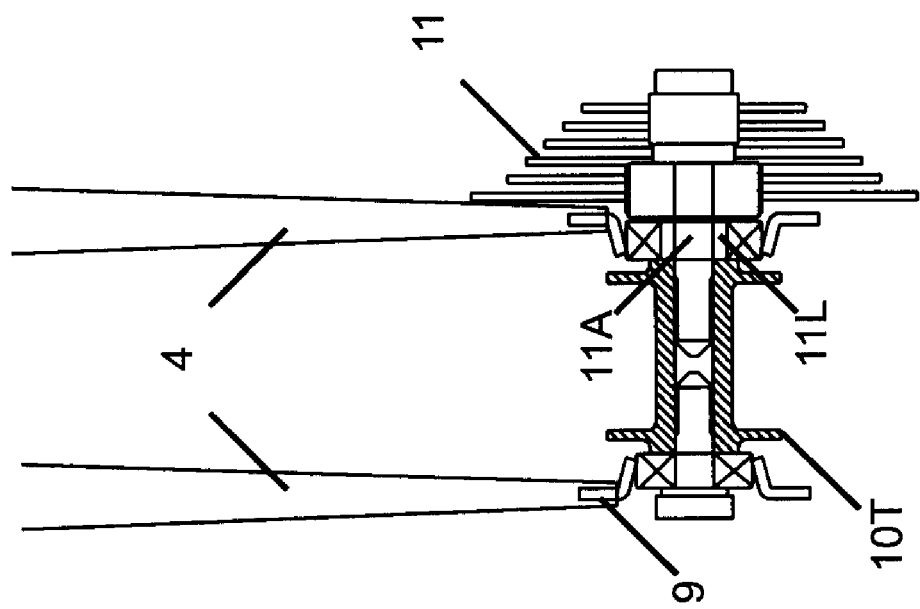
FIG. 5 illustrates a back fork part.

In FIG. 5 there is shown a back fork part 4, which has external back wheel package 11 with a free wheel. The back fork part 4 has a detachable connection axle 11A for the back wheel, with a slot joint and a spiral joint for joining the back wheel package to the wheel hub. In the Figure there is also shown a connection piece 11L for joining the back wheel package to the back wheel bearing 19 in the flexible bearing housing 9.

Figure 6:
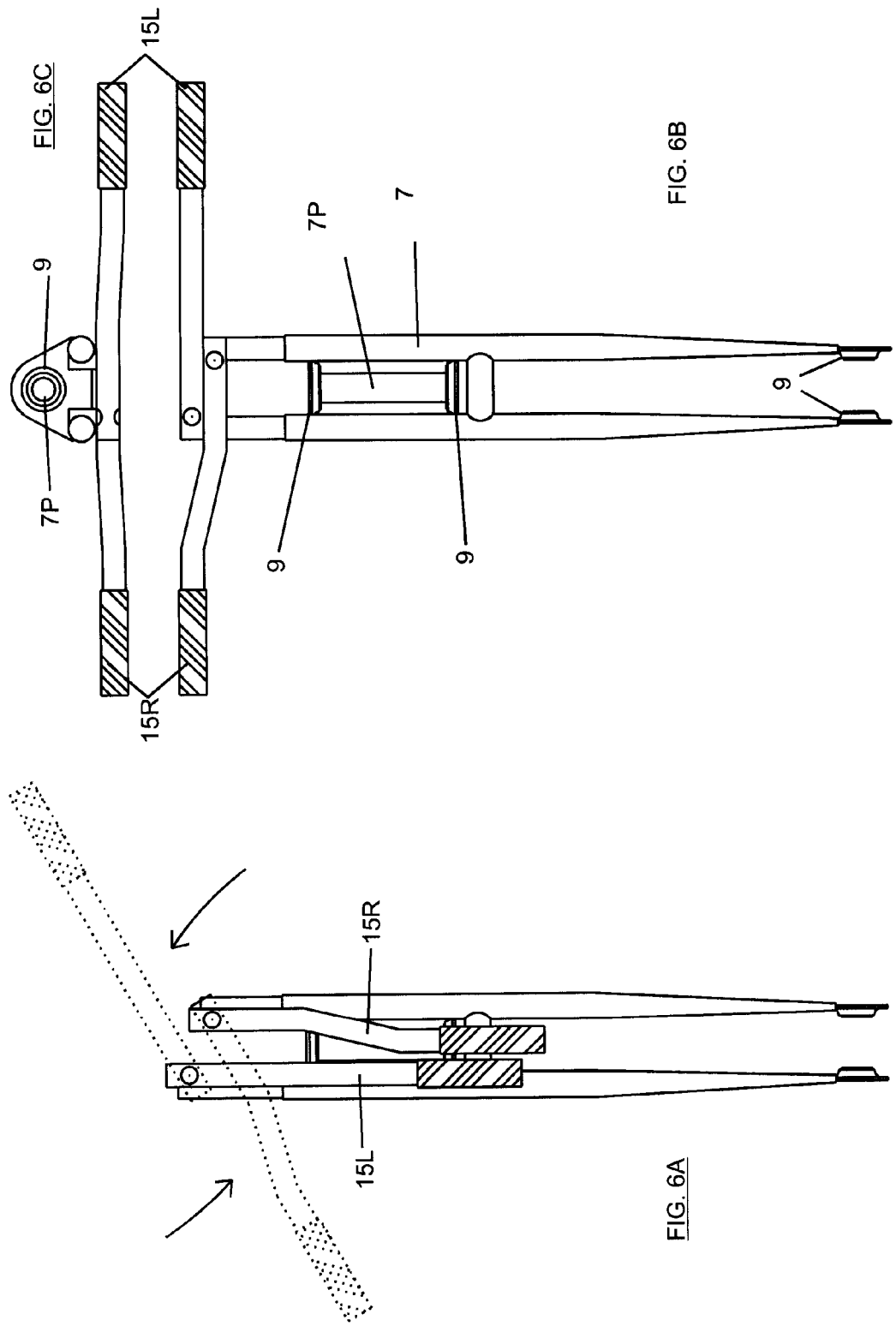
FIGS. 6A, 6B and 6C illustrate a front fork with handlebar.

FIG. 6A illustrates a front fork 7, which has foldable handlebars 15R and 15L as folded. FIGS. 6B and 6C illustrate the front fork 7, which has foldable handlebars 15B and 15L folded in the open/riding position. FIGS. 6A and 6B further show the flexible bearing housing 9 connected to the front fork 7 for connecting the front wheel (not shown). The figure also shows the front fork head tube 7P, which is connected to the front fork by flexible bearing housings 9. The flexible bearing housings have bearings (not shown), on which the front fork part 7N can rotate in relation to the head tube 7P.

Figure 7:
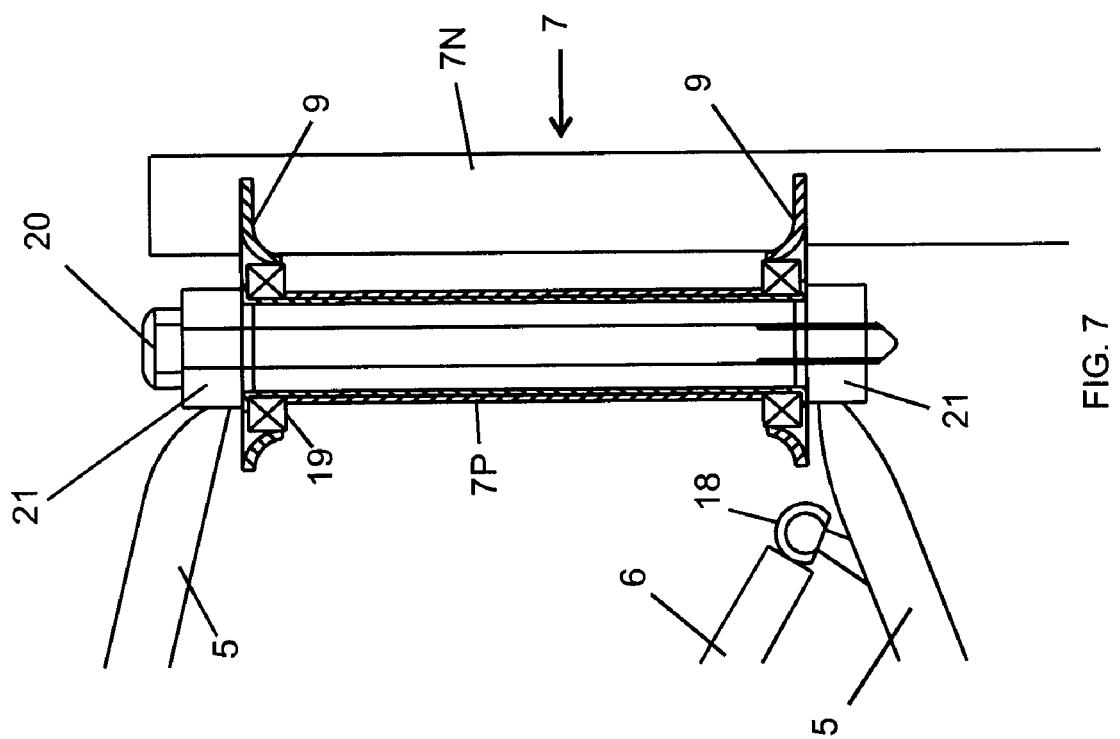
FIG. 7 illustrates a head tube for the front fork.

In FIG. 7 the bicycle frame 1 has a front fork 7 with a head tube 7P, which is connected to the fork part 7N of the head tube 7P by flexible bearing housings 9. The flexible bearing housings 9 have guide bearings 19, on which the other parts of the front fork 7 can rotate in relation to the head tube 7P. The head tube 7P has two nested pipes, which lock the guide bearings 19 to the head tube. The figure also shows two openable head tube connection parts 5 with head tube connection elements 21, to which the head tube 7P has been unrotatably attached by a pipe shaft 20. The lower connection part 5 of the front fork has further been connected to the support part 6 by a ball joint.

Figure 8:
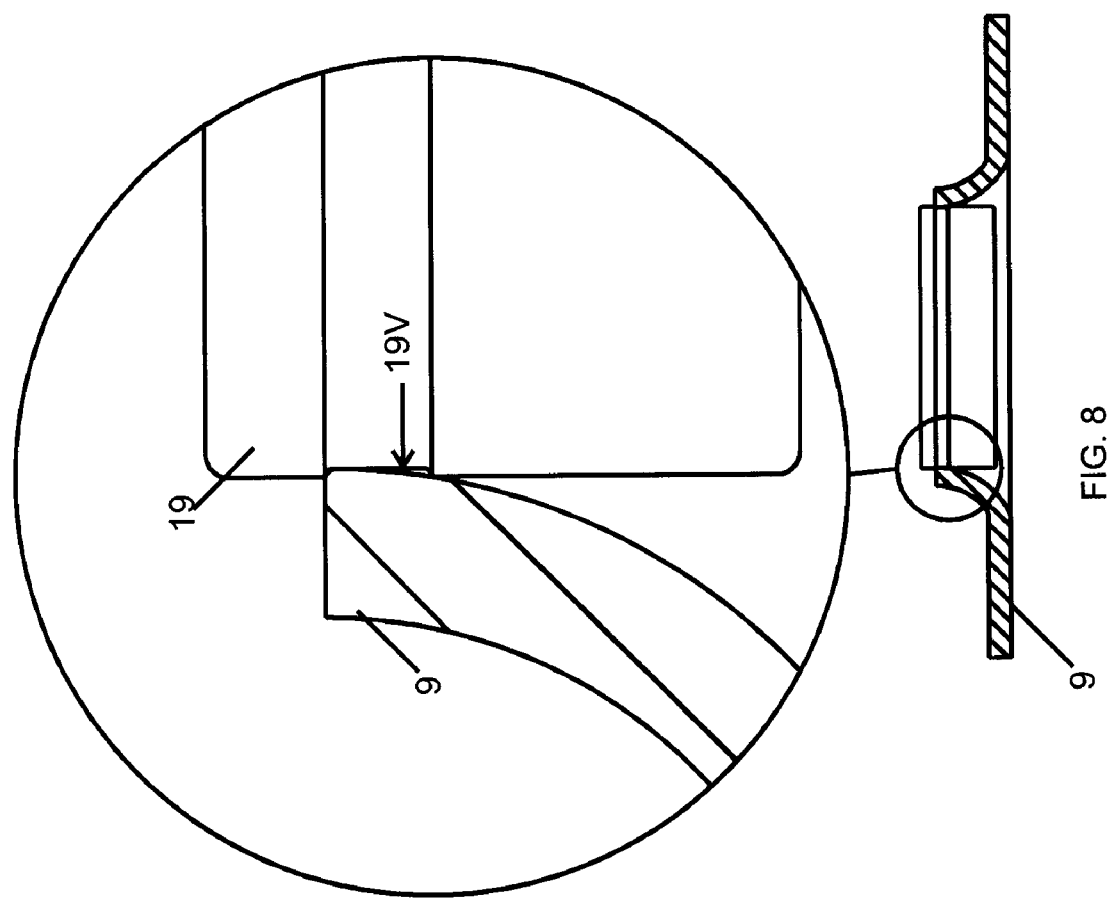
FIG. 8 illustrates a flexible bearing housing.

FIG. 8 is a detailed view of a flexible bearing housing 9, to which a bearing 19 has been fastened, with the connecting slot 19V acting as an adapter stop.

Figure 9:
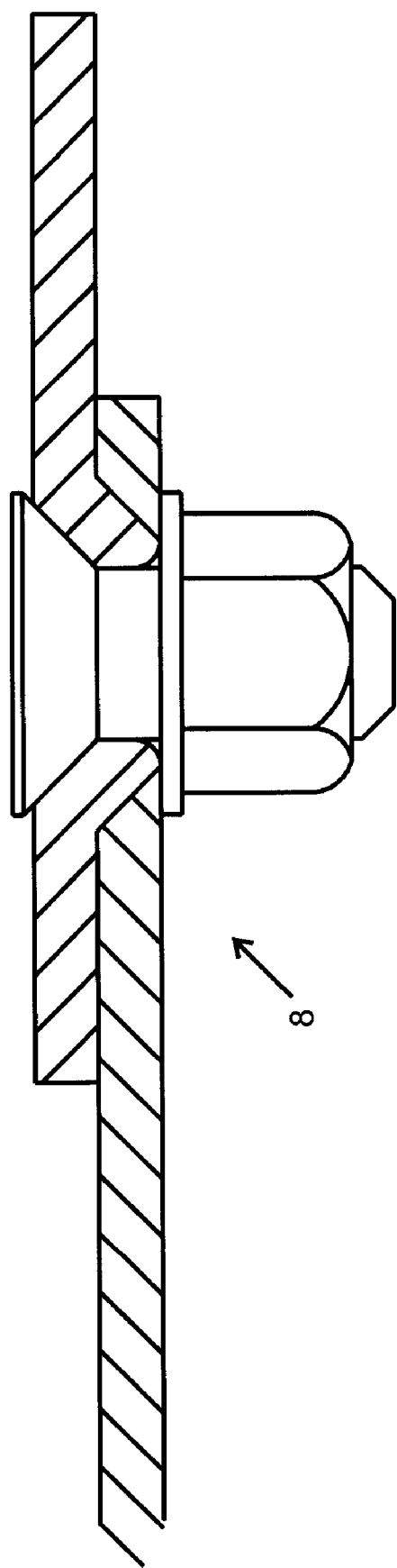
FIG. 9 illustrates a cone joint.

FIG. 9 is a detailed view of a cone joint 8.

Figure 10:
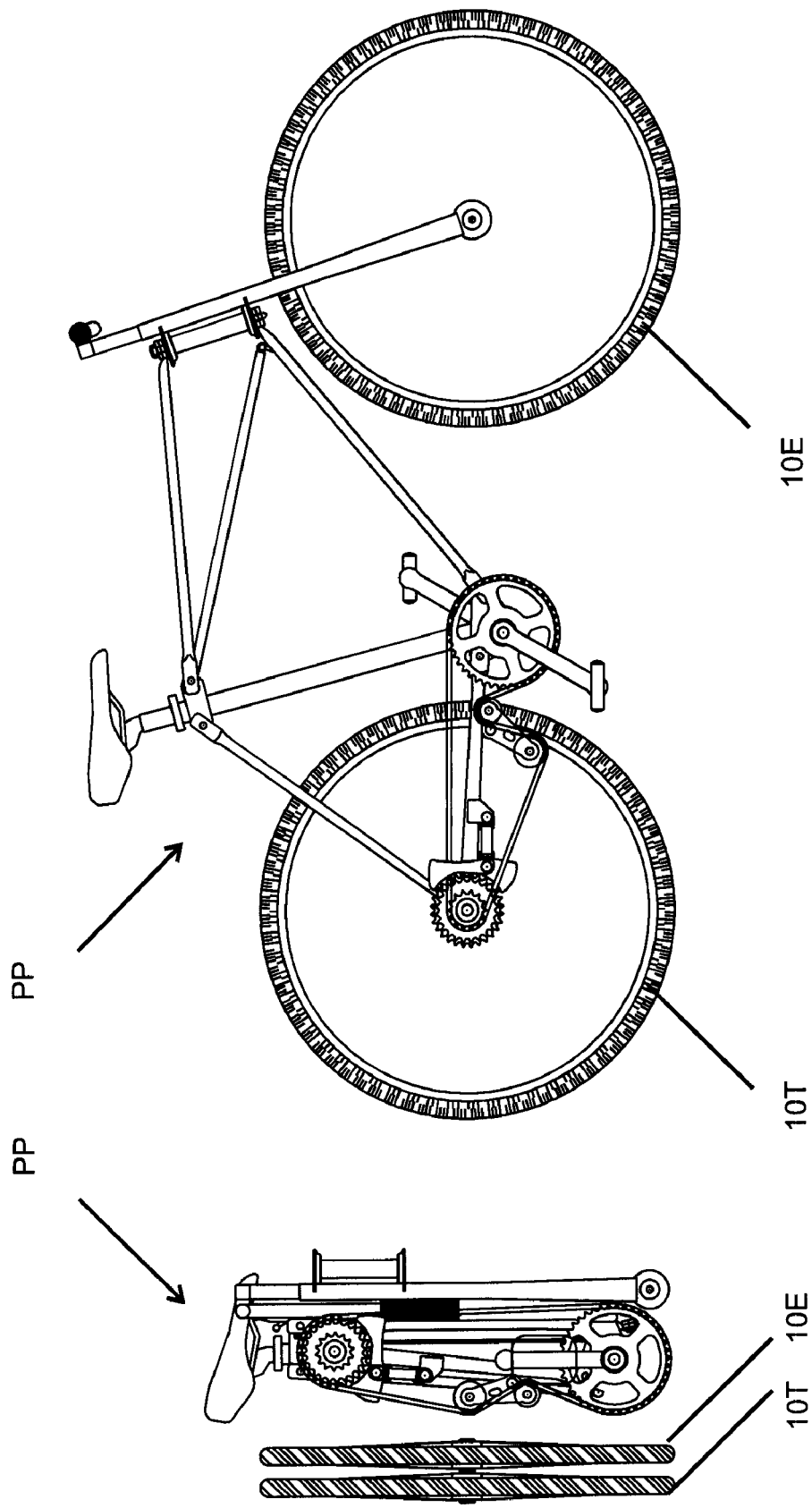
FIGS. 10A and 10B illustrate a bicycle that has been folded to a transport space and assembled.

In FIG. 10A there is shown the bicycle PP folded to the transport/storage condition, and in FIG. 10B it is shown assembled to the working order. The back wheel 10T and the front wheel 10E are advantageously structurally uniform with each other, i.e. in this case they also are advantageously interchangeable. Also the shafts of the back wheel 10T and the front wheel 10E are especially narrow so that they can easily be transported e.g. side by side.

Figure 11:
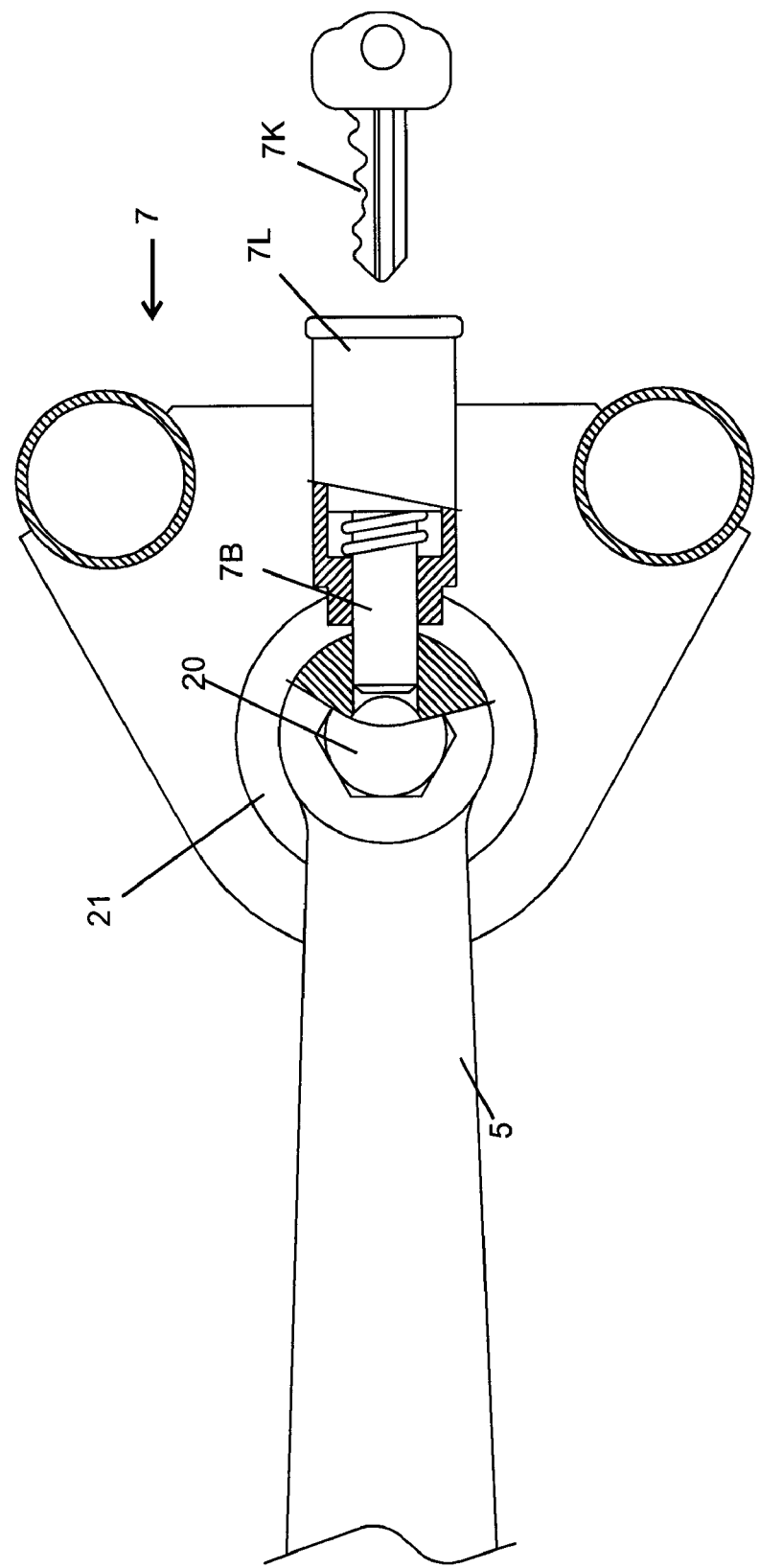
FIG. 11 illustrates a locking element for the bicycle frame.

FIG. 11 illustrates the front fork locking element 7L for locking the position of the front fork 7. An openable connection part 5 has been connected to the front fork, the part having a head tube connection element 21, to which the front fork 7 has been attached. The locking element 7L has a locking tongue 7B, which prevents the rotation of the front fork 7. The locking element 7L is provided with a locking key 7K, with which the position of the locking tongue can be locked to the closed/open position.

FIGS. 12A-12C show the bicycle frame 1 with a pedal hub connection part 2, frame column part 3, back fork part 4, and two foldable and openable head tube connection parts 5, and two foldable support parts 6. When folding the bicycle frame 1, according to FIG. 12A, the support part 6 has first been folded onto the frame column part 3, and the first openable head tube connection part 5 has been folded onto this so that the head tube connection element 21 is set to the mounting opening 5A in the second openable connection part 5 of the head tube upon folding. After this, as is shown in FIG. 12B, the second head tube connection part 5 is folded onto the first openable connection part 5 of the head tube. FIG. 12C shows the bicycle frame 1 after folding. The back fork part 4 and the support part 6 for the back fork part are turned to the side of the frame column part 3 opposite to the two openable head tube connection parts 5 and support parts 6 for the connection part 5.

The invention claimed is:

1. A bicycle frame, comprising:
   a pedal hub connection part (2);
   a frame column part (3); and
   a separate front fork (7) with a head tube (7P); one or several openable head tube connection parts (5) for openably connecting the front fork (7), and the openable head tube connection part (5) has an unrotatable connection element (21) connected to the connection part for unrotatably connecting to the head tube (7P) of the front fork (7), the head tube (7P) has a bearing assembly (19) for rotatably connecting the front fork (7) and the head tube (7P) to each other, and the front fork head tube (7P)

is connected to the bearing assembly (19) from an inner side of the bearing assembly.

2. The bicycle frame according to claim 1, wherein the bicycle frame (1) has at least one frame part (2, 3, 4, 5, 6), which are connected to each other (2, 3, 4, 5, 6) either directly or indirectly by a folding connection (8).

3. The bicycle frame according to claim 2, characterised in that the folding connection (8) is a cone joint or a folding joint.

4. The bicycle frame according to claim 3, wherein the frame part (2, 3, 4, 5, 6) can be folded in relation to another frame part at least partly in an interlocked manner for folding the bicycle frame (1).

5. The bicycle frame according to claim 2, wherein the frame part (2, 3, 4, 5, 6) can be folded in relation to another frame part at least partly in an interlocked manner for folding the bicycle frame (1).

6. The bicycle frame according to claim 2, wherein the bicycle frame (1) has one or several foldable back fork parts (4).

7. The bicycle frame according to claim 6, wherein the back fork part (4) has external back wheel package (11) with a free wheel.

8. The bicycle frame according to claim 2, wherein the bicycle frame (1) has one or several foldable support parts (6).

9. The bicycle frame according to claim 1, wherein the bicycle frame (1) has one or several flexible bearing housings (9).

10. The bicycle frame according to claim 1, wherein a front fork (7) has been connected to the bicycle frame (1), the front fork having foldable handlebars (15L, 15R), such as handlebars (15L) to be folded in the direction of the front fork or handlebars (15R) that can be folded open in an interlocked/superimposed manner in relation to each other.

11. The bicycle frame according to claim 1, wherein the bicycle frame (1) has a front fork locking element (7L) for locking the position of the front fork (7).

12. The bicycle frame according to claim 1, wherein the bicycle frame (1) has one or several flexible bearing housings (9), the elasticity of which is at least equal to the adapter stop (19V) of the bearing (19) to be fitted into the bearing housing (9).

13. The bicycle frame according to claim 1, wherein the head tube (7P) has been connected to the fork part (7N) by flexible bearing housings (9) having the bearing assembly (19).

14. A bicycle, an exercise bicycle, a test bicycle, hand bicycle or a recumbent bicycle, having a bicycle frame (1) according to claim 1.

15. A bicycle frame (1), comprising:
a pedal hub connection part (2);
a frame column part (3);
a separate front fork (7) with a fork part (7N), a head tube (7P) and a plurality of bearings (19), said head tube (7P) is connected inside the plurality of bearings (19), and said fork part (7N) is connected outside the bearings (19) for rotatably connecting the fork part (7N) and the head tube (7P) to each other; and
at least one openable head tube connection part (5) having an unrotatable connection element (21) connected to the connection part for connecting the at least one openable head tube connection part (5) unrotatably to said a head tube (7P) of the front fork from the inside of said plurality of bearings (19) so that said fork part (7N) can rotate from the outside of the plurality of bearings in relation to said head tube (7P) of the front fork.

16. The bicycle frame according to claim 15, wherein the bicycle frame (1) has at least one frame part (2, 3, 4, 5, 6), which are connected to each other (2, 3, 4, 5, 6) either directly or indirectly by a folding connection (8).

17. The bicycle frame according to claim 16, wherein the folding connection (8) is a cone joint or a folding joint.

18. The bicycle according to claim 16, wherein the at least one frame part (2, 3, 4, 5, 6) can be folded in relation to another frame part at least partly in an interlocked manner for folding the bicycle frame (1).

19. The bicycle frame according to claim 18, wherein the back fork part (4) has an external back wheel package (11) with a free wheel.

20. The bicycle frame according to claim 16, wherein the bicycle frame (1) has at least one several foldable back fork parts (4).

21. The bicycle frame according to claim 16, wherein the bicycle frame (1) has at lest one foldable support part (6).

22. The bicycle frame according to claim 15, wherein the bicycle frame (1) has at least one flexible bearing housings (9).

23. The bicycle frame according to claim 15, wherein the bicycle frame (1) has at least one flexible bearing housing (9), the elasticity of which is at least equal to an adapter stop (19V) of the bearing (19) to be fitted into the bearing housing (9).

24. The bicycle frame according to claim 15, wherein the head tube (7P) has been connected to the fork part (7N) by flexible bearing housings (9) having the bearing assembly (19).

25. The bicycle frame according to claim 15, wherein a front fork (7) has been connected to the bicycle frame (1), the front fork having foldable handlebars (15L, 15R) to be folded in a direction of the front fork or handlebars (15R) that can be folded open in an interlocked/superimposed manner in relation to each other.

26. The bicycle frame according to claim 15, wherein the bicycle frame (1) has a front fork locking element (7L) for locking the position of the front fork (7).

27. A bicycle, exercise bicycle, test bicycle, hand bicycle or recumbent bicycle, having a bicycle frame (1) according to claim 15.

28. A method to manufacture a bicycle frame, comprising:
assembling the bicycle frame with a pedal hub connection part (2) and frame column part (3), wherein said bicycle frame (1) has a separate front fork (7) supplied with a fork part (7N), a head tube (7P) and bearings (19), and said head tube (7P) of the front fork is connected inside the bearings (19), and said fork part (7N) is connected outside the bearings (19) for rotatably connecting the fork part (7N) and the head tube (7P) to each other, and that said bicycle frame (1) is supplied with at least one openable head tube connection part (5) having an unrotatable connection element (21) connecting the at least one openable head tube connection part (5) unrotatably to head tube (7P) of the front fork from the inside of said bearings (19) so that said fork part (7N) can rotate from the outside of the bearings in relation to said head tube (7P) of the front fork.

29. A method for the manufacture of a bicycle frame with a pedal hub connection part (2) and frame column part (3), comprising:
arranging a front fork (7) with a head tube (7P), and arranging and an openable head tube connection part (5) to the bicycle frame (1) for openably connecting the front fork (7), the openable head tube connection part (5) is supplied with an unrotatable connection element (21) connected to the connection part for unrotatably connecting the head tube (7P) of the front fork (7) to the connection element, the head tube (7P) is supplied with a bearing assembly (19) for rotatably connecting the front fork (7) and the head tube (7P) to each other, and that the front fork head tube (7P) is connected to the bearing assembly (19) from an inner side of the bearing assembly.

* * * * *